United States Patent [19]
Cornut et al.

[11] Patent Number: 5,873,709
[45] Date of Patent: *Feb. 23, 1999

[54] DEVICE FOR PRODUCING COMPRESSED AIR FOR VARIOUS USES

[75] Inventors: Alain Cornut, Les Barbieres; Gérard Cornut, Saint Etienne, both of France

[73] Assignee: ETS Cornut S.A., France

[*] Notice: This patent issued on a continued prosecution application filed under 37 CFR 1.53(d), and is subject to the twenty year patent term provisions of 35 U.S.C. 154(a)(2).

[21] Appl. No.: 745,460

[22] Filed: Nov. 12, 1996

[51] Int. Cl.⁶ ...................................................... F04B 17/00
[52] U.S. Cl. .......................... 417/381; 417/313; 417/435
[58] Field of Search ................................... 417/381, 313, 417/407, 435; 60/39.142, 39.07

[56] References Cited

U.S. PATENT DOCUMENTS

| | | | |
|---|---|---|---|
| 3,358,909 | 12/1967 | Mansson et al. | 60/39.142 |
| 4,009,972 | 3/1977 | Sarle | 417/407 |
| 4,028,883 | 6/1977 | Meyer-Kahrweg | 60/39.142 |
| 4,312,179 | 1/1982 | Zaugg | 60/39.142 |
| 4,490,622 | 12/1984 | Osborn | 417/406 |
| 4,622,817 | 11/1986 | Kobayashi | 60/608 |
| 4,815,277 | 3/1989 | Vershure, Jr. et al. | 60/39.142 |
| 5,235,803 | 8/1993 | Rodgers | 60/39.07 |
| 5,235,954 | 8/1993 | Sverdlin | 123/447 |
| 5,329,757 | 7/1994 | Faulkner et al. | 60/39.142 |
| 5,649,517 | 7/1997 | Poola et al. | 123/585 |

*Primary Examiner*—Charles G. Freay
*Assistant Examiner*—Cheryl J. Tyler
*Attorney, Agent, or Firm*—Wall Marjama Bilinski & Burr

[57] ABSTRACT

The device of the current invention produces volumes of compressed air by utilizing a turbocharger, a compact combustion assembly, and a hydraulic power pack. The turbocharger includes a turbine and centrifugal compressor, each being interconnected using a pressure-lubricated bearing such that the turbine drives the compressor. Compressed air leaving the compressor is passed through a junction box containing a plurality of air distribution nozzles. The nozzles direct the compressed air either to a pressurized receptacle or back to the combustion assembly in order to provide a source of air for a combustion chamber. This device will economically obtain significant volumes of compressed air more efficiently than other known methods.

19 Claims, 1 Drawing Sheet

DEVICE FOR PRODUCING COMPRESSED AIR FOR VARIOUS USES

BACKGROUND OF THE INVENTION

The object of the invention relates to the technical field of means of compressing air for mobile or fixed plant.

The equipment currently used to supply compressed air to assemblies intended to convey products in powder form is of the screw or vane type. This equipment is heavy, bulky, requires relatively complex installation and is affected by significant constraints in terms of friction and mechanical wear.

It was to overcome these drawbacks and improve the performance of this type of equipment to a notable extent that the device according to the invention was designed.

SUMMARY OF THE INVENTION

To achieve this and according to a first aspect, the device for producing compressed air essentially consists of a turbocharger of the type fitted on turbocharged diesel engines, a compact combustion assembly incorporating all the necessary means for operation and a hydraulic power pack connected to a pressure-lubricated bearing of the turbocharger.

BRIEF DESCRIPTION OF THE DRAWING

These aspects and others will be apparent from the following description, reference being made to the diagram of a typical device in one embodiment.

DESCRIPTION OF THE INVENTION

Figure 1:
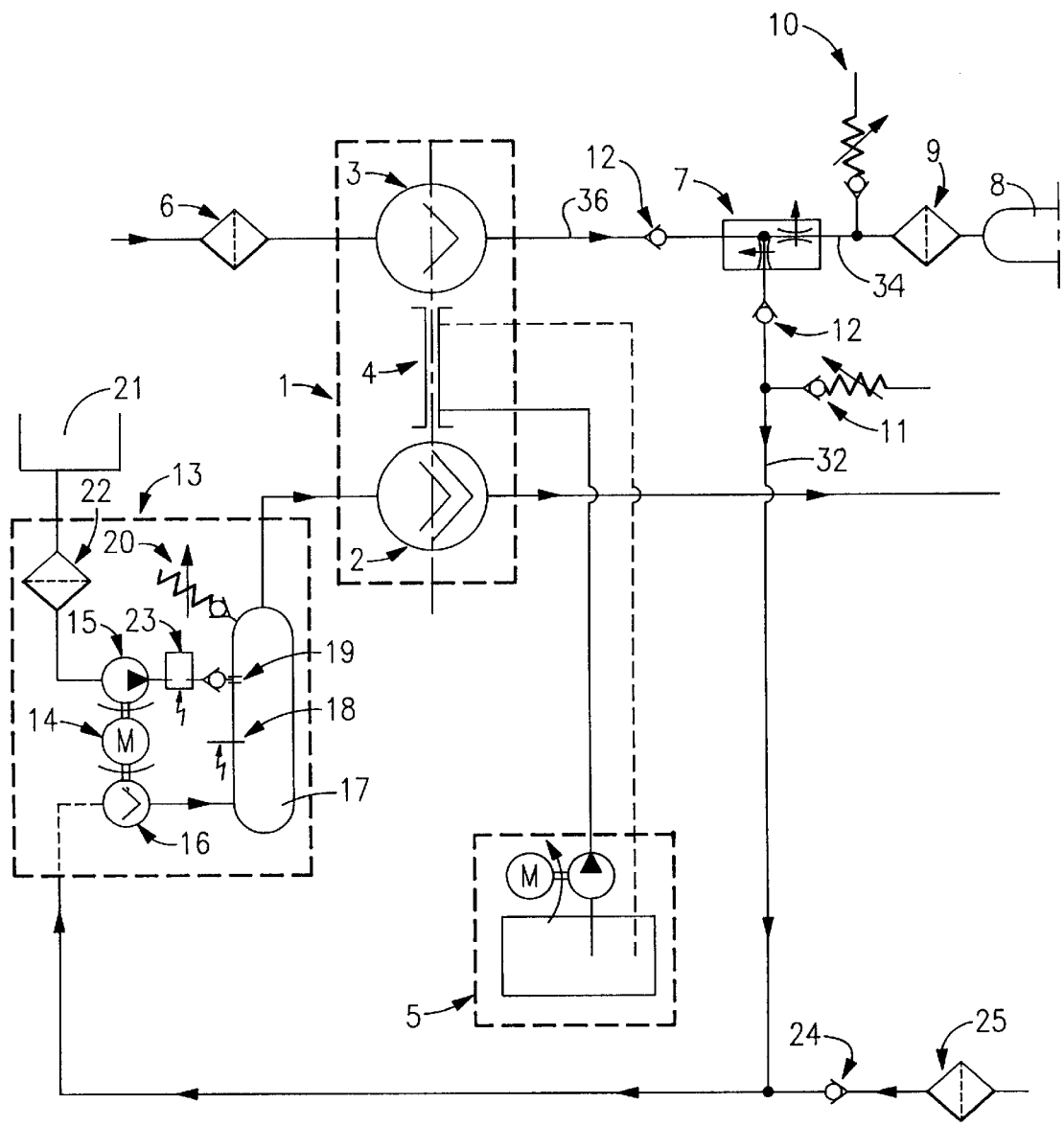

The device comprises a turbocharger referred to in its entirety as (1) of the type fitted on turbocharged diesel engines, i.e. comprising a turbine (2) driving a centrifugal compressor (3) through a pressure-lubricated bearing (4) powered by a conventional hydraulic power pack (5).

The air admitted into the centrifugal compressor is cleaned by a filter (6) and, at the outlet, the compressed air is partly directed to the turbine (2) along a first flowpath (32) by fixed or automatically adjusted or manually controlled air nozzles (7) and partly directed to a pressurised operating receiver (8) along a seperate second flow path (34), after having been purified by a filter (9) the compressor including an outlet or discharge line (36) which extends from the outlet of the compressor to the air nozzles (7) forming the junction for the two flow paths (32),(34). The pressure of the compressed air directed to the receiver is monitored by a valve (10) and that of the compressed air directed to the turbine is monitored by a valve (11). Nonreturn valves (12) are provided either side of the air nozzles (7) for the start-up phase which is described below.

Here, the energy to drive the turbocharger (1) is provided by a combustion unit or assembly referred to in its entirety as (13) comprising an electric motor (14) that drives, on the same shaft, a gas oil pump (15) and a starter turbine (16) used to start the cycle. The combustion assembly also comprises a combustion chamber (17) fitted with an igniter (18), a jet (19) and a valve (20) for monitoring the pressure in the chamber.

The gas oil is drawn from a tank (21) by suction and flows through a filter (22) before reaching the pump (15) connected to jet (19) by valve (23) for monitoring the gas oil flowrate.

A check valve (24) and a filter (25) ensure a supply of air to combustion chamber (17) at the time the device is started; starting can be obtained by various means such as a mechanical flywheel, an air tank, high or low-pressure hydraulic means, an electric motor or other means consisting of one or more of the above-mentioned features.

The device described uses air heated by gas oil as a drive fluid but the latter can also be obtained by using gas, steam or liquids.

Similarly, the power sources used to heat this fluid can be electricity (using heating elements), gas or other appropriate fuels.

The compact device thus obtained can be used to produce large volumes of compressed air economically and with greater reliability than that associated with screw compressors or vane pumps and with practically no maintenance because there is no friction or mechanical wear.

The device can be stationary or installed on any type of means of land, sea or air transport. One particular prospective application is in the transport of products in powder form on vehicles.

We claim:

1. An apparatus for producing compressed air for various uses, said apparatus comprising:

a turbocharger having a turbine connected to a centrifugal compressor through a pressure-lubricated bearing;

a compact combustion assembly connected to said turbine for providing a heated drive fluid to said turbine;

a hydraulic power pack linked to said pressure-lubricated bearing;

a plurality of distribution air nozzles disposed in an outlet path of said centrifugal compressor, said nozzles being used for directing compressed air from said compressor along separate first and second flow paths extending therefrom;

said first flow path extending from said plurality of nozzles to said compact combustion assembly for powering said turbine; and said second flow path extending from said plurality of nozzles to a pressurized receiver to provide volumes of compressed air from said apparatus, each of said first and second flow paths extending from the outlet path of said compressor, said device further including monitoring valves separately disposed along each of said first and second flow paths for monitoring air pressure and non-return valves disposed on inlet and outlet sides of said distribution air nozzles, one said non-return valve being disposed between said combustion assembly and said plurality of nozzles along the first flow path and the other said non-return valve being disposed between said plurality of air nozzles and said centrifugal compressor along said compressor outlet path.

2. The apparatus of claim 1 wherein the distribution air nozzles are non-adjustable.

3. The apparatus of claim 1, wherein the distribution nozzles are adjustable to control the flow through said first and second flow paths.

4. The apparatus of claim 3 wherein said distribution nozzles are manually adjusted.

5. The apparatus of claim 3 wherein said distribution nozzles are automatically adjusted.

6. The apparatus of claim 1, wherein the heated drive fluid a combustible gas.

7. The apparatus of claim 1, wherein the heated drive fluid is a combustible liquid.

8. The apparatus of claim 1, wherein said heated drive fluid is heated by electricity.

9. The apparatus of claim 1 wherein said compact combustion assembly includes an electric motor coupled by a fuel line to a fuel pump for delivering fuel from a reservoir to a combustion chamber and to a starter turbine, a filter mounted in said fuel line, an igniter for igniting fuel in the combustion chamber, a jet means for introducing fuel from the fuel pump into said combustion chamber, a control valve for regulating fuel delivered to said jet means and monitoring means for monitoring the pressure in said combustion chamber.

10. The apparatus of claim 9 including an air supply line for bringing combustion air initially to said combustion assembly along said first flow path.

11. The apparatus of claim 10 that further includes a hydraulic means for starting said combustion unit.

12. The apparatus of claim 10 that further includes an electric motor means for starting the combustion unit.

13. The apparatus of claim 10, including at least one air filter disposed adjacent said air supply line for cleaning air entering said combustion assembly along said first flow path.

14. The apparatus of claim 10, including valve means for selectively allowing air from said air supply line to enter said first flow path.

15. The apparatus of claim 1 wherein said drive fluid is a gas.

16. The apparatus of claim 1 wherein said drive fluid is a liquid.

17. The apparatus of claim 1 wherein said drive fluid is steam.

18. The apparatus of claim 1, including at least one air filter adjacently disposed relative to an input of said centrifugal compressor for cleaning air entering said turbocharger.

19. The apparatus of claim 1, including at least one air filter adjacently disposed relative to said receiver for cleaning compressed air entering therein along said second flow path.

* * * * *